United States Patent
Metz

(10) Patent No.: US 9,628,877 B2
(45) Date of Patent: Apr. 18, 2017

(54) SYSTEM HAVING A HOUSEHOLD APPLIANCE AND A RECEPTION UNIT, AND METHOD FOR PROVIDING A PIECE OF INFORMATION

(71) Applicant: BSH HAUSGERAETE GMBH, Munich (DE)

(72) Inventor: Florian Metz, Unterfoehring (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 14/653,505

(22) PCT Filed: Nov. 21, 2013

(86) PCT No.: PCT/EP2013/074361
§ 371 (c)(1),
(2) Date: Oct. 8, 2015

(87) PCT Pub. No.: WO2014/095218
PCT Pub. Date: Jun. 26, 2014

(65) Prior Publication Data
US 2016/0057512 A1    Feb. 25, 2016

(30) Foreign Application Priority Data
Dec. 18, 2012    (DE) .................. 10 2012 223 615

(51) Int. Cl.
*H04Q 9/00*     (2006.01)
*H04W 4/00*    (2009.01)
(Continued)

(52) U.S. Cl.
CPC ............ *H04Q 9/00* (2013.01); *H04L 12/2825* (2013.01); *H04L 67/125* (2013.01); *H04W 4/005* (2013.01);
(Continued)

(58) Field of Classification Search
CPC ... H04L 12/2825; H04L 67/125; H04L 67/26; H04Q 2209/40; H04Q 9/00; H04W 4/005; H04W 4/02
See application file for complete search history.

(56) References Cited

U.S. PATENT DOCUMENTS 6,557,756 B1    5/2003    Smith
7,789,967 B2    9/2010    Classen et al.
(Continued)

FOREIGN PATENT DOCUMENTS

DE    3911862 A1    10/1990
DE    4004097 A1    8/1991
(Continued)

*Primary Examiner* — Sisay Yacob
(74) *Attorney, Agent, or Firm* — Laurence A. Greenberg; Werner H. Stemer; Ralph E. Locher

(57) ABSTRACT

A system includes a household appliance and a reception unit. The household appliance is configured to sense a property of a consumable that is used during the operation of the household appliance and to transmit data relating to the sensed property to the reception unit. The reception unit is configured to provide a piece of information on the basis of the data received from the household appliance. The reception unit has a position finding device that determines a physical position for the reception unit and provides the piece of information on the basis of the determined position.

12 Claims, 2 Drawing Sheets

(51) Int. Cl.
*H04W 4/02* (2009.01)
*H04L 12/28* (2006.01)
*H04L 29/08* (2006.01)

(52) U.S. Cl.
CPC .............. *H04W 4/02* (2013.01); *H04L 67/26* (2013.01); *H04Q 2209/40* (2013.01)

(56) References Cited

U.S. PATENT DOCUMENTS

| | | |
|---|---|---|
| 8,121,614 B2 | 2/2012 | Lee |
| 2001/0049846 A1 | 12/2001 | Guzzi et al. |
| 2005/0050647 A1 | 3/2005 | Tanaka et al. |
| 2008/0027816 A1* | 1/2008 | Han ................... G06Q 20/10 705/17 |
| 2010/0262554 A1 | 10/2010 | Elliott |
| 2010/0286801 A1* | 11/2010 | Yum .................. H04L 12/2809 700/90 |

FOREIGN PATENT DOCUMENTS

| | | |
|---|---|---|
| DE | 10358969 A1 | 7/2005 |
| DE | 102008037021 A1 | 2/2010 |
| DE | 102008044122 A1 | 6/2010 |
| EP | 0965795 A2 | 12/1999 |
| EP | 1186694 A2 | 3/2002 |
| GB | 2458444 A | 9/2009 |
| WO | 0196645 A2 | 12/2001 |

* cited by examiner

SYSTEM HAVING A HOUSEHOLD APPLIANCE AND A RECEPTION UNIT, AND METHOD FOR PROVIDING A PIECE OF INFORMATION

BACKGROUND OF THE INVENTION

Field of the Invention

The invention relates to a system having a household appliance and a reception unit, wherein the household appliance is embodied to sense a property of a consumable that is used during the operation of the household appliance and to transmit data relating to the sensed property to the reception unit, and wherein the reception unit is designed to provide a piece of information on the basis of the data received from the household appliance. The invention also relates to a method for providing a piece of information by means of a reception unit.

DE 103 58 969 A1 discloses a dishwasher having a dosing apparatus for adding additives into the washing tub and a method for dosing additives into the washing tub of a dishwasher.

DE 39 11 862 A1 describes a level monitoring facility for a device for storing a number of pumpable detergent or active rinsing agents in a container and for the automatically dosed addition of active substance doses required during the washing or rinsing process into the outer tub of a washing machine or dishwasher.

The unexamined patent applications EP 0 965 795 A2, DE 10 2008 044 122 A1, DE 40 04 097 A1 and EP 1 186 694 A2 disclose household appliances, which can connect to a network for communication and data exchange purposes.

WO 01/96645 A2 finally describes a detergent sensor of a washing machine with an automatic level sensor, which is embodied to transmit this level information to an operator by email for instance.

BRIEF SUMMARY OF THE INVENTION

The object of the invention is to provide a user of a household appliance with information relating to this household appliance in an improved manner.

This object is achieved by a system having the features as claimed and a method as claimed.

The inventive system includes a household appliance and a reception unit, wherein the household appliance is embodied to sense a property of a consumable that is used during the operation of the household appliance and to transmit data relating to the sensed property to the reception unit. Moreover, the reception unit is embodied to provide a piece of information on the basis of the data received from the household appliance. The reception unit includes a position sensing facility, which is embodied to determine a spatial position of the reception unit. The reception unit is finally embodied to provide information as a function of the determined position.

Provision is therefore made in particular to provide the information relating to the consumable as a function of the position determined by means of the position sensing facility. The information can therefore be provided in particular as a function of the respective location at which the reception unit is disposed. This ensures that information is only then provided if this is also deemed to be necessary on the basis of the determined location. A user of the household appliance, who carries the reception unit on him, is in this way only then provided with the information relating to the consumable if this is indicated by the location at which the user is disposed. Information is consequently provided in a very targeted fashion and the unnecessary repetition of information is in particular reliably prevented.

The consumable can be a substance or a material which can be used optionally or compulsorily during the operation of the household appliance. The information provided by means of the reception unit can explicitly reproduce the sensed property or be formed by a secondary piece of information which derives from the sensed property. The position sensing facility may include in particular a GPS (global positioning system) sensor. Provision can be made for one and the same piece of information to be provided in a different manner as a function of the determined position, a piece of information or no information to be provided and/or different information content to be provided.

The reception unit is preferably embodied to be variable in terms of position with respect to the household appliance. The household appliance is then in particular not permanently connected with the reception unit. The reception unit can in particular be embodied such that it can be easily transported by a user. In this way a piece of information relating to the household appliance can be provided to the user at almost any location, even if he is very far away from the household appliance. Direct visual contact with the household appliance is in particular not necessary.

Means for wireless data transmission are preferably provided in order to transmit data from the household appliance to the reception unit. In particular, provision can be made for the household appliance to include a receive and transmit apparatus, which can have radio contact with a receive and transmit apparatus of the reception unit for signal and data transmission purposes by way of electromagnetic waves. Alternatively, provision can however also be made for the household appliance to be connected to a transmit apparatus by way of a wired network, for instance the telephone network or the internet and for this transmit apparatus to be able to communicate wirelessly with the reception unit. Provision can in particular be made for the household appliance to be connected to a mobile radio network. A high degree of mobility is ensured in this way with respect to the reception unit.

The reception unit is preferably embodied as a mobile telephone and/or as a mobile computing apparatus, in particular as a tablet PC. The reception unit can then be embodied in particular as a multifunctional device, which, aside from the provision of information received from the household appliance, is also embodied to provide other information. In particular, the reception unit can be embodied to ensure mobile access to the internet or to a mobile radio network. Suitable software can be provided herefor on the reception unit. Means for providing information relating to the property of the consumable can then be provided in particular in the form of a software module on the reception unit, in particular in the form of a so-called app. Such a multifunctionality of the reception unit results in a high acceptance by a user. If necessary reception units known from the prior art can be modified in a simple and uncomplicated manner, thereby ensuring the ability to provide information relating to the consumable. If applicable, a software implementation is easy to realize.

The reception unit preferably includes a display unit, wherein information relating to the data received from the household appliance can be displayed on the display unit. A visual display is easy for a user to detect and easy to understand.

The household appliance is preferably embodied to sense a quantity of consumable as a property. The information provided by the reception unit then preferably relates to this quantity. Provision can be made for instance for an indication of quantity with respect to the consumable currently present in the household appliance to be output to a user by means of the reception unit. In this way the user is able to identify if too little consumable is present in the household appliance. He can then take suitable measures to change the provided quantity of consumable. It is particularly preferred if this quantity information is then provided to the user if the position sensing facility identifies that the reception unit (and thus the user) is disposed in the vicinity of a location where the consumable may be available. The user can then initiate steps to pick up the consumable and to transport it to the household appliance for the purpose of increasing the consumable quantity.

The household appliance is preferably embodied to care for laundry items, wherein the consumable then preferably includes a laundry care substance. Provision can in particular be made for a user to be informed by way of the reception unit that there is only a small amount of laundry care substance available if the user is at a location where laundry care substances are available to purchase. An electronic shopping list for laundry care substances can then be provided in particular by the reception unit.

The purchase of laundry care substances is then particularly easy and uncomplicated. Unnecessary additional journeys by the user to locations where laundry care substances are available are avoided if necessary. Time is saved and the environment is conserved.

A household appliance is in particular understood to mean devices for caring for laundry items. It can however also include devices for preparing foodstuffs, for cleaning dishes or such like and devices for storing and conserving foodstuffs. Washing machines, tumble dryers, ovens, hobs, steam cookers, microwaves, dishwashers, refrigerators, freezers etc, are mentioned in this context for instance. Similarly kitchen devices such as for instance a coffee machine or a kettle can also be provided.

The inventive method is used to provide a piece of information by means of a reception unit and includes the following steps:

Sensing a property of a consumable used during operation of the household appliance;
Transmitting data relating to the sensed property to the reception unit;
Providing the information on the basis of the data received by the reception unit.

It is also characteristic of the method that a spatial position of the reception unit is determined and the information is provided as a function of the determined position.

A condition for the sensed property and/or the determined position is preferably defined and a change in the type of provision of information is triggered as a function of the fulfillment of the condition. A defined condition can therefore be that a piece of information relating to the quantity of consumable is then only provided if this quantity does not reach a specific minimum quantity. In addition or alternatively, provision can be made for this information only then to be provided if a user with the reception unit is at a determined location, for instance a supermarket. The information is then especially provided in a manner appropriate to the situation and is matched to the requirements of a user.

Provision is preferably made that, in the event of the condition not being fulfilled, the information is provided in accordance with a first form of presentation and in the event of the condition being fulfilled, the information is provided in accordance with a second form of presentation which differs from the first. Provision can preferably be made here for the second form of presentation to include in particular an indication to an operator of the reception unit relating to the fulfillment of the condition. Provision can particularly preferably be made for an in particular quantitative specification of the quantity of consumable to take place in accordance with the first form of presentation. According to the second form of presentation, provision can then in particular be made for no quantitative specification of the quantity to take place if a defined minimum quantity is not reached, but only a warning to take place such that the defined minimum quantity is not being reached. This warning can in particular then always take place if the minimum quantity is not reached, irrespective of the respective location at which the reception unit is disposed. It is nevertheless particularly preferable for this second form of presentation only then to be selected if both the minimum quantity is not reached and also the reception unit is positioned at a determined location. This can ensure for instance that a user is only then notified of the consumable quantity if he is at a location where this consumable is also available. Warnings perceived to be disturbing are then reliably prevented in this way. A comprehensive piece of information of a user is consequently insured.

The second form of presentation is preferably embodied such that operator control action by the operator is required on the reception unit in order to trigger a changeover to the first form of presentation. In particular, interaction with the reception unit can be provided in the form of a confirming operator control action. A warning is then in particular no longer provided if this is confirmed by a user. This ensures that the user also reliably receives an important warning.

The transmission of data preferably takes place at a first point in time and the provision of information at a later second point in time relative to the first point in time, wherein a data transmission path for the transmission of data is interrupted at the second point in time and/or a means for sensing the property of the consumable is switched off and/or the household appliance is switched off. This then ensures that a user also then receives the information relating to the consumable if the reception unit can no longer exchange signals with the household appliance. Provision can in particular be made for this purpose that the transmitted data are stored in a database of the reception unit and the stored data is read out of the data base in order to provide the information. The most up-to-date information can then in particular be stored in the database, before the data transmission is interrupted on account of one of the afore-cited reasons. The provided information is then particularly up-to-date and therefore significant.

The preferred embodiments presented with reference to the inventive system and their advantages apply accordingly to the inventive method.

Further features of the invention result from the claims, the figures and the description of the figures. The features and feature combinations cited in the description and also the features and feature combinations cited in the description of the figures and/or features and feature combinations shown alone in the figures cannot only be used in the respectively specified combination but also in other combinations or alone, without departing from the scope of the invention.

The invention is described in more detail below with the aid of exemplary embodiments, in which:

DESCRIPTION OF THE INVENTION

Figure 1:
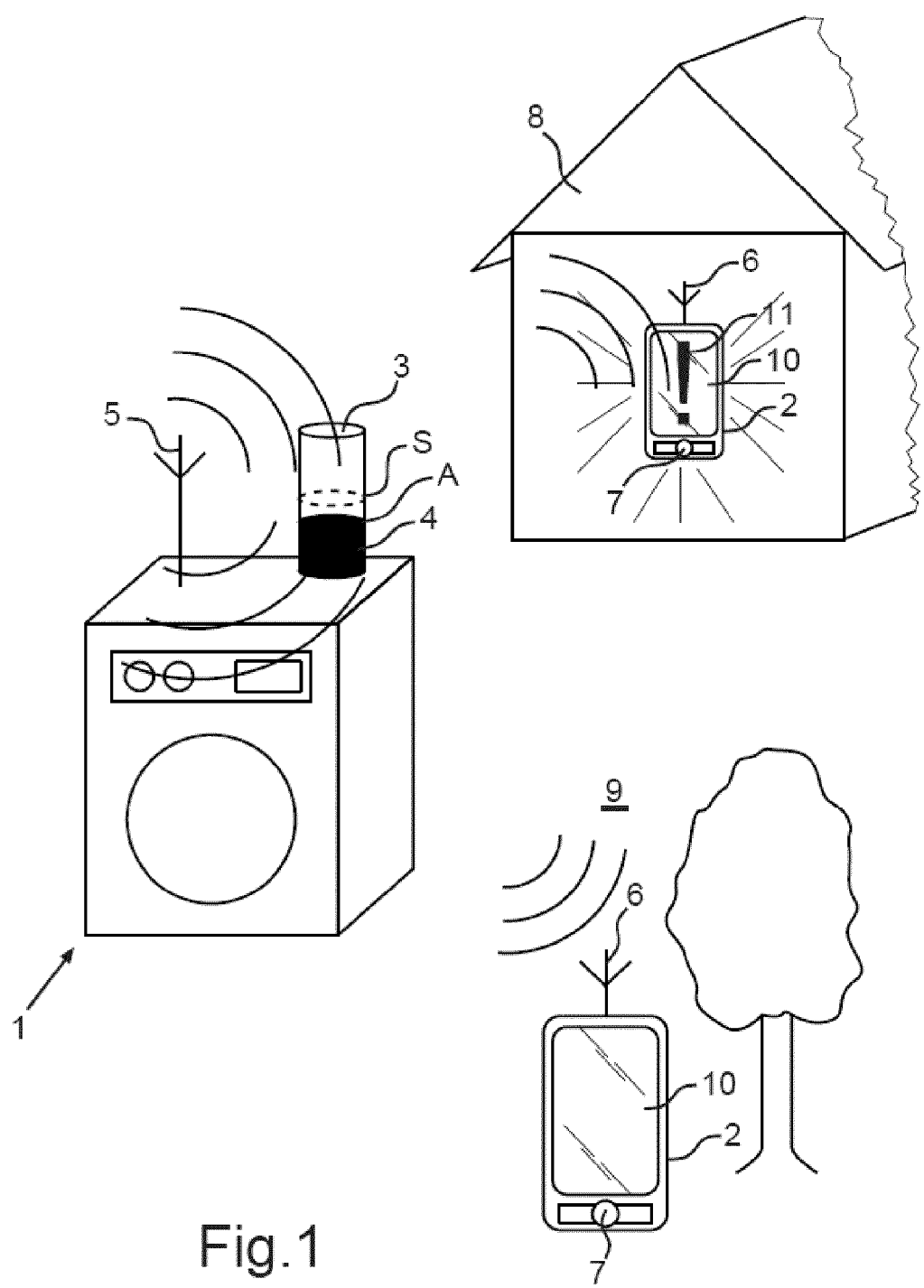
FIG. 1 shows a schematic representation of a household appliance, which has radio contact with a smart phone, wherein the smartphone is alternatively positioned at two different locations.

The same or functionally similar elements are provided with the same reference characters in the figures.

FIG. 1 shows a washing machine 1 with an automatic dosing apparatus 3. The dosing apparatus 3 can be in particular an apparatus which operates according to the cited i-DOS method. The dosing apparatus 3 is embodied to automatically supply detergent 4 into the washing machine 1 in accordance with the selected washing program. This ensures that only the detergent quantity which is also actually required is used. The current filling capacity of detergent 4 is indicated with A.

In the exemplary embodiment, the current filling capacity A can be automatically determined by a suitable quantity sensor in the dosing apparatus 3. If a target filling capacity S does not reach the current filling capacity A, a subsequent filling of the dosing apparatus 3 with detergent 4 is thus shown. The detergent 4 is a consumable of the washing machine 1. According to the prior art, the failure to reach the target filling capacity S is only read off the washing machine 1 or the dosing apparatus 3. Provision is therefore now made for the washing machine 1 or dosing apparatus 3 to include a transmit apparatus with a transmit antenna 5, which is embodied to transmit data relating to the current filling capacity A or a piece of information relating to the failure to reach the target filling capacity S to a smartphone 2. For data transmission via radio, the smartphone 2 has a receive antenna 6. A piece of information which relates to the current filling capacity A can then be provided to a user by means of the smartphone 2 which represents a reception unit.

To this end the smartphone 2 has a monitor 10, on which the information can be visually displayed prepared in accordance with different forms of presentation. For instance, a warning indicator 11 can take place, which is shown symbolically in FIG. 1 by means of an exclamation mark.

Provision is now made for this warning indicator not always to be displayed, but only if a specific condition for the position of the smartphone 2 is fulfilled. To this end the smartphone 2 has a GPS receiver 7, with the aid of which the current position of the smartphone 2 can be determined. If a user with the smartphone 2 is in a position 9 for instance, for instance out in the open country in the vicinity of a tree, it is unnecessary to provide a piece of information relating to the current filling capacity A.

If however the GPS receiver 7 identifies that the user, together with his smartphone 2, is in a supermarket 8, it can be assumed that detergent 4 is available to purchase within said supermarket 8. It is therefore now useful to indicate to the user via the warning indicator 11 that the target filling capacity S has not been reached and detergent is required for operation of the washing machine 1. On account of this information, it is then possible for the user to promptly purchase detergent and refill the same into the dosing apparatus 3.

Without the provided functionality, the user would if necessary firstly identify that the target filling capacity S is not reached if he has visual contact with the washing machine 1. He must then obtain detergent by for instance making his way to the supermarket 8. This takes time and damages the environment. Instead, the warning indicator 11 provides an electronic shopping list, which ensures that the detergent 4 is replaced promptly.

Figure 2:
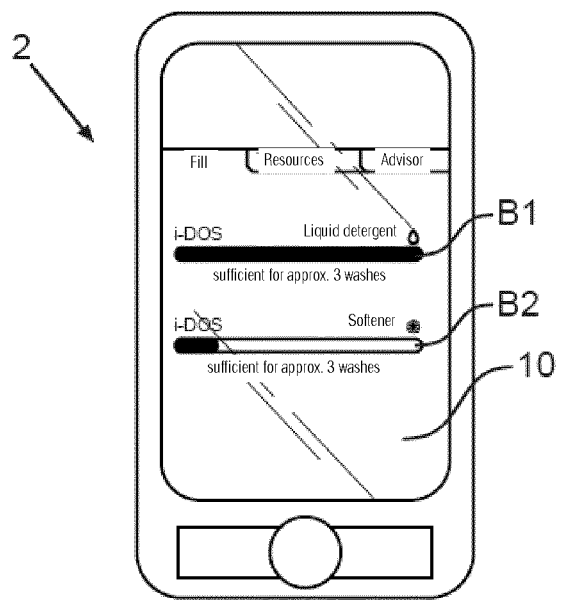
FIG. 2 shows a provision of a piece of information on a monitor of a smartphone according to a first form of presentation.
Figure 3:
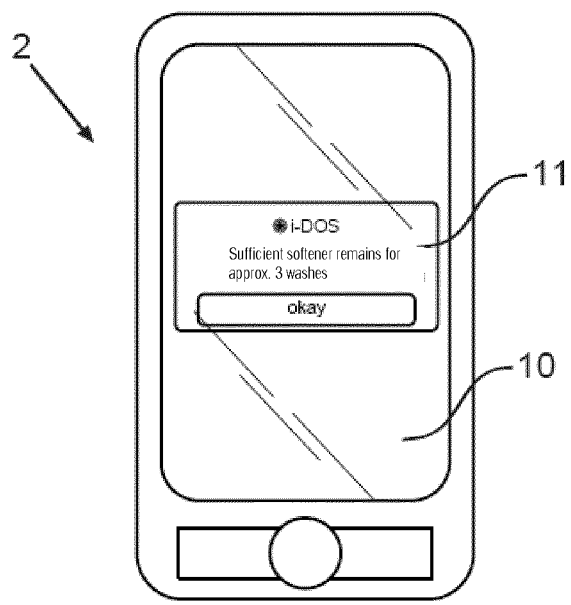
FIG. 3 shows a provision of a piece of information on a monitor of a smartphone according to a second form of presentation.

According to FIG. 2, provision can be made for the operator to inform himself of the current filling capacity A of detergent 4 at any location (for instance at the position 9 or in the supermarket 8). To this end a bar display B1 or B2 is loaded onto the monitor 10 of the smartphone 2 after a software program is called up by the operator, with the aid of which the amount of detergent 4 which is still available can be intuitively seen. In the exemplary embodiment two bar displays B1 and B2 are provided for the quantity of liquid detergent (B1) and softener (B2). This embodiment is suitable if two automatic dosing apparatuses 3 (one for liquid detergent and one for softener) are attached to the washing machine 1. Aside from the bar displays B1 or B2, it is also possible to estimate the number of washing processes for which the respective consumable is still sufficient. Therefore in accordance with the exemplary embodiment in FIG. 2, the liquid detergent is still sufficient for approx. 30 washes, while the softener is only sufficient for approx. 3 washes.

If the operator with the smartphone 2 now goes to the supermarket 8, this position is identified by means of the GPS receiver 7. A warning in the form of the warning indicator 11 is then output to the operator. A form of presentation with an interactive warning is then selected. "Sufficient softener remains for approx. three washes" is indicated on the monitor 2. This takes place in the form of a pop-up window. By touching the interactive control pane designated with "okay", the operator can confirm the warning and revert to the first form of presentation in accordance with the displays shown in FIG. 2.

Networking the washing machine 1 with the smartphone 2 can take place for instance by way of WLAN, Bluetooth or similar wireless communication paths. The sensor of the dosing apparatus 3 then conveys the current level or the current filling capacity A by way of this transmit connection (aside from the quantity, information relating to the type of consumable, for instance liquid detergent or softener) can also be conveyed to the smartphone application within the scope of a synchronization. The GPS-assisted smartphone application in the smartphone 2 identifies the current location of the user and indicates a possible low level of the filling capacity in the dosing apparatus 3 in a time and/or situation-conditioned manner. The smartphone application here enables a time and/or location-independent piece of information relating to the last current fill status of the dispensers of the dosing apparatus 3 irrespective of whether the dosing apparatus 3 is switched on or off. A synchronization during the last device operation can be provided herefor, wherein data relating to the filling capacity can be stored in a database of the application in the smartphone 2. The user can now promptly remember to replace any washing agents by the GPS-assisted application outputting a location-related (for instance supermarket, pharmacy or suchlike) message on the smartphone 2, which indicates a possible low level of the filling capacity in the dosing apparatus 3. An electronic shopping list is virtually produced.

LIST OF REFERENCE CHARACTERS

1 Washing machine
2 Smartphone
3 Dosing apparatus
4 Detergent
5 Transmit antenna
6 Receive antenna
7 GPS receiver
8 Supermarket
9 Position
10 Monitor
11 Warning indicator
A Current filling capacity
S Target filling capacity
B1, B2 Bar display

The invention claimed is:

1. A system, comprising:
a household appliance and a reception unit;
said household appliance having a dosing apparatus with a quantity sensor being configured to sense a quantity of a detergent in said dosing apparatus, wherein the detergent is used during an operation of said household appliance, the household appliance being further configured to transmit data related to the sensed quantity of the detergent to said reception unit;
said reception unit including a position sensing facility for determining a spatial position of said reception unit;
said reception unit being configured to provide an item of information based on the data received from the household appliance and as a function of the determined spatial position;
a predetermined condition for said sensed quantity of the detergent and said determined position effects a change in how said item of information is provided in dependence on whether or not the predetermined condition is fulfilled;
said reception unit being configured to provide said item of information in accordance with a first form of presentation if said predetermined condition is not fulfilled; said reception unit being configured to provide said item of information in accordance with a second form of presentation which differs from said first form of presentation if said predetermined condition is fulfilled;
said second form of presentation including a warning to an operator of the reception unit relating to the fulfillment of said predetermined condition.

2. The system according to claim 1, wherein said reception unit is movably disposed relative to said household appliance.

3. The system according to claim 2, which comprises wireless transmission means for transmitting the data wirelessly from said household appliance to said reception unit.

4. The system according to claim 3, wherein said reception unit is a mobile telephone, a smart phone, or a mobile computing apparatus.

5. The system according to claim 4, wherein said mobile computing apparatus is a tablet device.

6. The system according to claim 1, wherein said reception unit includes a display unit configured to display information related to the data received from said household appliance on said display unit.

7. The system according to claim 1, wherein said household appliance is configured to sense as the property a quantity of the detergent and the information provided by said reception unit relates to the quantity of the detergent.

8. The system according to claim 1, wherein said household appliance is a laundry care device and the detergent includes a laundry care substance.

9. A method of providing information by way of a reception unit, the method comprising:
sensing a quantity of a detergent in a dosing apparatus of a household appliance, wherein the detergent is used during an operation of said household appliance;
transmitting data relating to the sensed quantity of the detergent from the household appliance to the reception unit;
determining a spatial position of the reception unit;
defining a condition for the sensed quantity of the detergent and for the determined spatial position;
providing an item of information on the basis of the data received from the household appliance and as a function of the determined spatial position of the reception unit;
if the defined condition is not fulfilled, providing the information in accordance with a first form of presentation; and
if the defined condition is fulfilled, providing the information in accordance with a second form of presentation which differs from the first form of presentation; and
wherein the second form of presentation includes a warning to an operator of the reception unit relating to the fulfillment of the defined condition.

10. The method according to claim 9, wherein the second form of presentation includes a requirement that the operator perform a user control action on the reception unit in order to trigger a changeover to the first form of presentation.

11. The method according to claim 9, wherein: the step of transmitting the data is effected at a first point in time; the step of providing the item of information is effected at a second point in time that is later than the first point in time; and a data transmission path for transmitting the data is interrupted at the second point in time and/or a means for sensing the property of the detergent is switched off and/or the household appliance is switched off.

12. The method according to claim 11, wherein the data transmitted to the reception unit is stored in a database of the reception unit and the stored data is read out of the database for providing the information.

* * * * *